(12) United States Patent
Tzvetkov

(10) Patent No.: US 9,221,518 B2
(45) Date of Patent: Dec. 29, 2015

(54) UNIVERSAL SKIP-FREE DERAILLEUR

(71) Applicant: Tzvetan Nedialkov Tzvetkov, New York, NY (US)

(72) Inventor: Tzvetan Nedialkov Tzvetkov, New York, NY (US)

( * ) Notice: Subject to any disclaimer, the term of this patent is extended or adjusted under 35 U.S.C. 154(b) by 409 days.

(21) Appl. No.: 13/847,922

(22) Filed: Mar. 20, 2013

(65) Prior Publication Data

US 2013/0225340 A1 Aug. 29, 2013

Related U.S. Application Data

(63) Continuation-in-part of application No. 12/533,634, filed on Jul. 31, 2009, now abandoned.

(51) Int. Cl.
*B62M 9/12* (2006.01)
*B62M 9/134* (2010.01)

(52) U.S. Cl.
CPC *B62M 9/12* (2013.01); *B62M 9/134* (2013.01)

(58) Field of Classification Search
CPC ........ B62M 9/12; B62M 9/134; B62M 9/131; B62M 9/1244
USPC ....................................... 474/80, 82
See application file for complete search history.

(56) References Cited

U.S. PATENT DOCUMENTS

| | | | | |
|---|---|---|---|---|
| 4,734,083 | A * | 3/1988 | Nagano | 474/78 |
| 5,205,794 | A * | 4/1993 | Browning | 474/160 |
| 5,649,877 | A * | 7/1997 | Patterson | 474/80 |
| 5,738,603 | A * | 4/1998 | Schmidt et al. | 474/158 |
| 6,447,413 | B1 * | 9/2002 | Turer et al. | 474/80 |
| 8,337,343 | B2 * | 12/2012 | Lin | 474/82 |
| 2009/0098964 | A1 * | 4/2009 | Kim | 474/81 |
| 2013/0061705 | A1 * | 3/2013 | Jordan | 74/473.13 |
| 2014/0265219 | A1 * | 9/2014 | Scolari et al. | 280/261 |

* cited by examiner

Primary Examiner — William E Dondero
Assistant Examiner — Robert T Reese

(57) ABSTRACT

A front derailleur with controllable full rotational movement with two operator selectable radial arms—one for pole-vaulting the chain to larger sprockets, the other for sliding the chain to smaller sprockets.

17 Claims, 9 Drawing Sheets

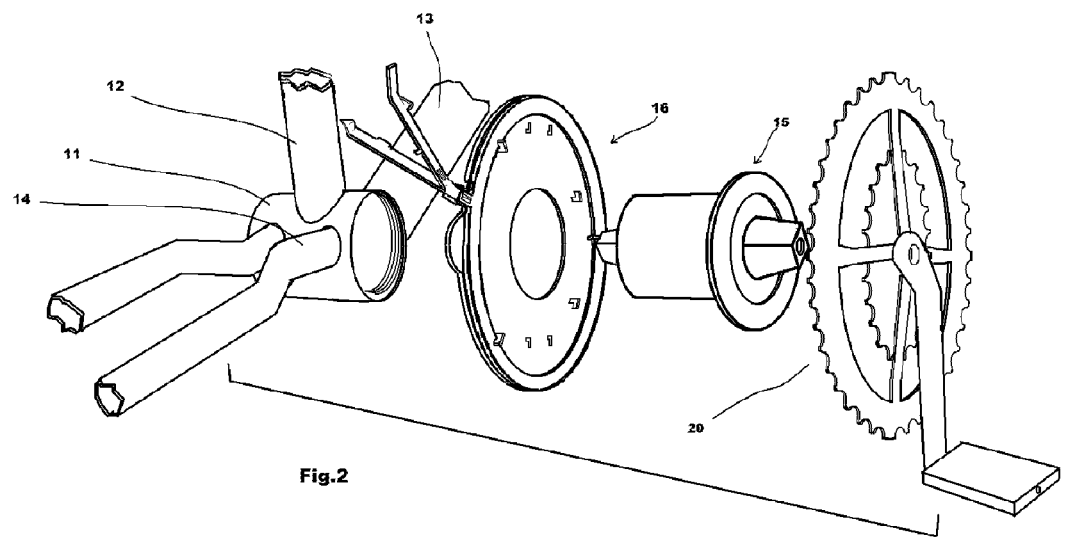
Fig.2
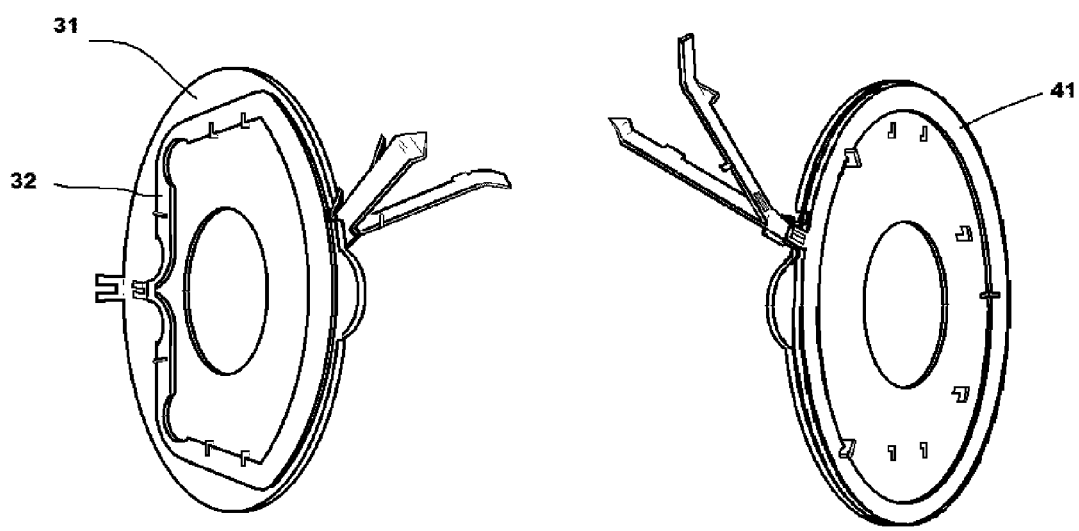
Fig.3
Fig.4

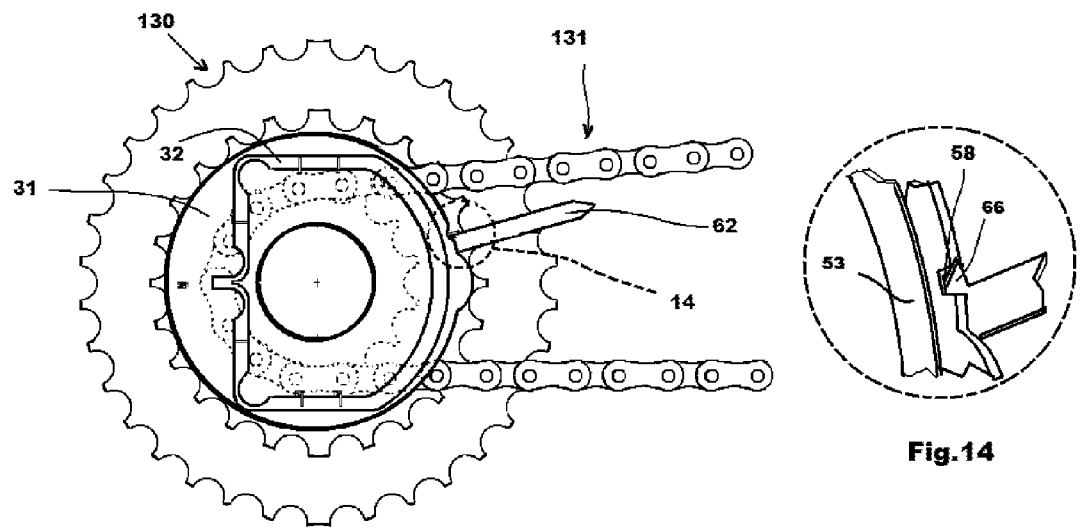
Fig. 13
Fig. 14
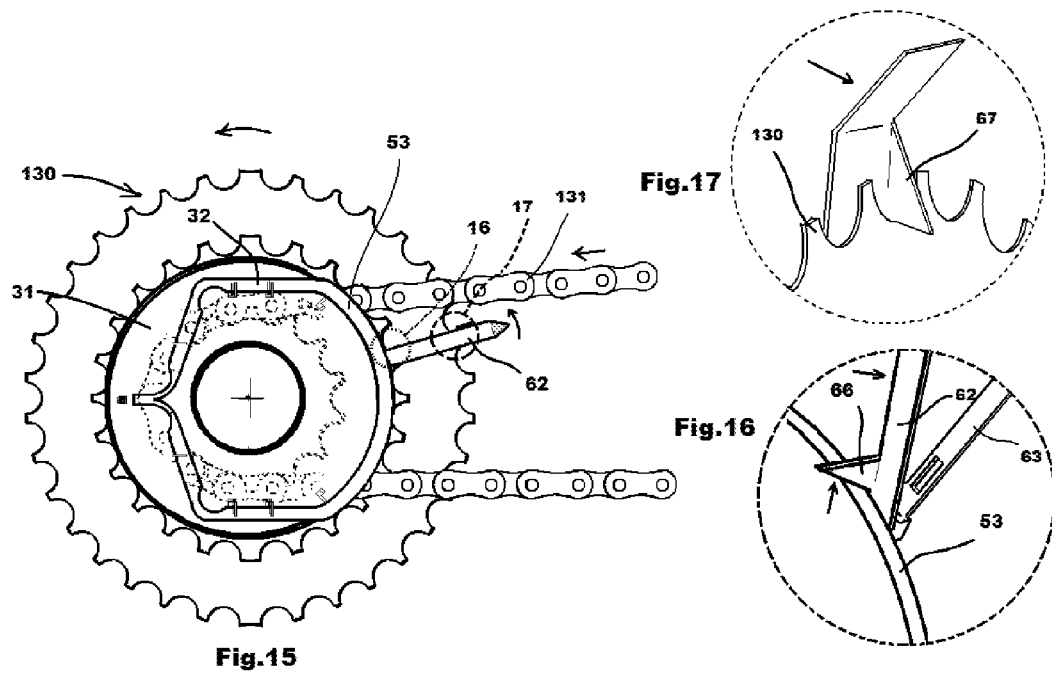
Fig. 15
Fig. 17
Fig. 16

US 9,221,518 B2

UNIVERSAL SKIP-FREE DERAILLEUR

CROSS REFERENCES TO RELATED APPLICATION

This is a continuation-in-part (CIP) of Ser. No. 12/533,634, filed Jun. 31, 2009, pending. The related application is hereby incorporated by reference, for all purposes, as if fully set forth herein.

STATEMENT REGARDING FEDERALLY SPONSORED RESEARCH OR DEVELOPMENT

Not Applicable

BACKGROUND OF THE INVENTION

1. Field of the Invention

This invention relates generally to bicycle derailleurs. More specifically, this invention relates to a derailleur design, which is suited for the front, driving sprocket assembly.

2. Description of the Related Art

Conventional bicycle front derailleurs typically use a parallelogram mounted cage to force the chain against the adjacent larger sprocket when an upshift is initiated. The combination of rotation and friction eventually forces the chain to climb the larger sprocket and engage the teeth. Conversely, axial pressure by the cage forces the chain to derail from the larger sprocket and drop on the smaller sprocket. Since these movements of the chain occur in the loaded section of the chain, the operator has to reduce the pedaling force in order to allow the chain to climb the side of the larger sprocket, as friction is not sufficient to overcome the downward pressure of the tensioned chain. This happens usually when it is least affordable—while climbing a gradient. Similarly, when the chain derails from a larger to a smaller sprocket, the operator has to reduce the pedaling force, or the chain will slam on the smaller sprocket. Additionally, when the chain is not aligned between the front and rear sprockets, as in some gear combinations, the chain tends to rub against the sides of the cage producing noise and causing wear. Another problem with the typical front derailleur is the requirement of precise calibration of the travel of the cage in response to input from the control unit—the shifter. Deviation from very strict parameters causes the chain either to fail shifting or drop from the sprockets. To mitigate this problem, shifters have been continuously improved, resulting in complex and costly apparatuses, which can work only with the corresponding front derailleurs. Numerous attempts have been made to resolve these issues. Most make incremental improvements to the typical front derailleur as described in U.S. Pat. No. 4,734,083 to Nagano. An attempt to overcome the above mentioned shortcomings has been made by Sam Patterson in his U.S. Pat. No. 5,649,877 granted on Jul. 22, 1997. Yet another attempt can be seen in U.S. Pat. No. 8,337,343 granted to Chang Hui Lin on Dec. 25, 2012. Shifting precision has also been approached by introducing electronic control and actuation as seen in U.S. Pat. App. No. 20130061705.

The enumerated attempts fail to address the main cause of the shortcomings—the fact that the derailleur is stationary along the travel path of the chain: the cause of friction.

A different direction in which attempts have been made to overcome the shifting shortcoming is by modifying the sprockets in order to facilitate the derailing of the chain. An example of this approach can be seen in Schmidt, et al. U.S. Pat. No. 5,738,603 from Apr. 14, 1998. Besides putting an onus on manufacturing and the corresponding high cost, this kind of modification might weaken the sprockets.

A more radical attempt to solve the whole number of above stated problems has been made by Bruce Browning—U.S. Pat. No. 5,205,794 from Apr. 27, 1993. A brief look at the invention, however, reveals excessive complexity, weight and elevated manufacturing costs. Also, the invention has a very limited range of speeds and the sectored, articulated sprockets render them fragile and prone to failure.

SUMMARY OF THE INVENTION

It has long been admitted that a satisfactory solution to the problems of the front derailleur has not been found. It is the intention of this inventor to make a more imaginative attempt to solve the above described problems. For the purpose, an invention is proposed that offers the following benefits:

the derailleur rotates with the sprockets and acts as an agent for transferring the chain between the sprockets thereby avoiding friction with the chain;

the derailleur is stowed away from the path of the chain when not in use and is impervious to scraping against an excessively angled chain;

insignificant input effort is required from the operator, as the shifting of the chain occurs under its own tension and not by operator induced derailleur pressure;

because of the above, the controller—shifter can be a very simple lever similar to, and smaller than a brake lever and not requiring calibration to the derailleur;

upshifting and downshifting can be done both during forward pedaling and back pedaling;

shifting when pedaling up a steep gradient does not require any reduction in pressure on the pedals;

the derailleur comprises only 3 parts which can be manufactured by ordinary stamping and bending;

most of the derailleur can be made from a number of light materials;

the assembly of the derailleur can be executed without any fasteners;

with a slight modification of the actuator the derailleur is very suitable for electronic control;

The ways and means of manufacturing such a derailleur are described henceforth.

The proposed invention comprises 3 elements:

a base immovably fixed to the bicycle frame in a coplanar axial position inboard of the front sprockets a ring with 2 superposed arms, rotatably mounted on the outboard face of the base the outboard arm, called the downshift arm, when positioned between a sprocket and the chain, rotates with the sprocket and causes the chain to slide down its smooth surface and land on a smaller sprocket;

the inboard arm, called the upshift arm, covers the downshift arm when activated and by means of at least one tooth catches the chain. Since the arm is flexibly cantilevered and inclined towards the sprockets, the downward pressure of the chain deflects the arm further until it rests in the plane and over a larger sprocket, thereby depositing the chain on the larger sprocket. The motion is similar to that of a pole vaulting athlete.

an actuator, designed to extend a cam surface at the pull of a Bowden cable. The actuator is a trapezoid frame where the two parallel shoulders slide along slide guides formed in the base, another side is formed as an arched cam and the 4th side is articulated at the corners. The 4th side is further split in 2 levers pivoted on fulcrums formed in the base, which are articulated at the point of confluence. An attachment point for a Bowden cable is formed at the point of confluence of the shoulders. At the pull of the cable, the distal portions of the shoulders move forward extracting the cam, which in turn pushes a follower formed at the flexible shank of the 2 arms out of a recess groove. The arms tilt towards the sprockets, with the downshift arm meshing a tooth with the teeth of the sprocket. The sprocket entrains the whole assembly in a circular path. 2 scenarios follow:

in case the operator pulls the lever shortly, the rotation of the assembly starts, the follower sliding along the edge of the base, but the cam retracts and the upshift arm is not positioned to engage the chain. The chain lands on the downshift arm, sliding to a smaller sprocket.

in case the operator keeps the lever pulled for a longer period of time, the cam is extended and through the follower positions the arm with at least one tooth under the chain. The chain lands on the tooth and its pressure moves the arm towards a larger sprocket, where it is deposited.

In another preferred embodiment, the actuator is operated by a push from a solenoid controlled by a button or an electronic controller on the handlebar. Thereafter, the sequence is identical to the manual embodiment.

These and other features and advantages of the present invention will become apparent from the following description of one or more embodiments of the invention, taken together with the accompanying drawings.

BRIEF DESCRIPTION OF THE DRAWINGS

FIG. 2 is an exploded view of the front drive assembly.

FIG. 3 is an outboard perspective view of the proposed derailleur.

FIG. 4 is an inboard perspective view of the proposed derailleur.

FIG. 13 is an outboard view of the derailleur in stowed position.

FIG. 14 is an enlarged view of the cam follower of the derailing arms in its stowed position.

FIG. 15 is an outboard view of the derailleur at rotation initiation.

FIG. 16 is an enlarged view of the cam follower sliding over the extended cam.

FIG. 17 is an enlarged view of the entraining tooth meshed with the teeth of the largest sprocket.

DETAILED DESCRIPTION OF THE INVENTION

In broad terms, the proposed invention comprises 3 unitary elements: a base, a ring with 2 chain-shifting arms and an actuator. The ring and the actuator are mounted on the opposite faces of the base and then the assembly is fixed immovably to the bicycle frame.

Figure 1:
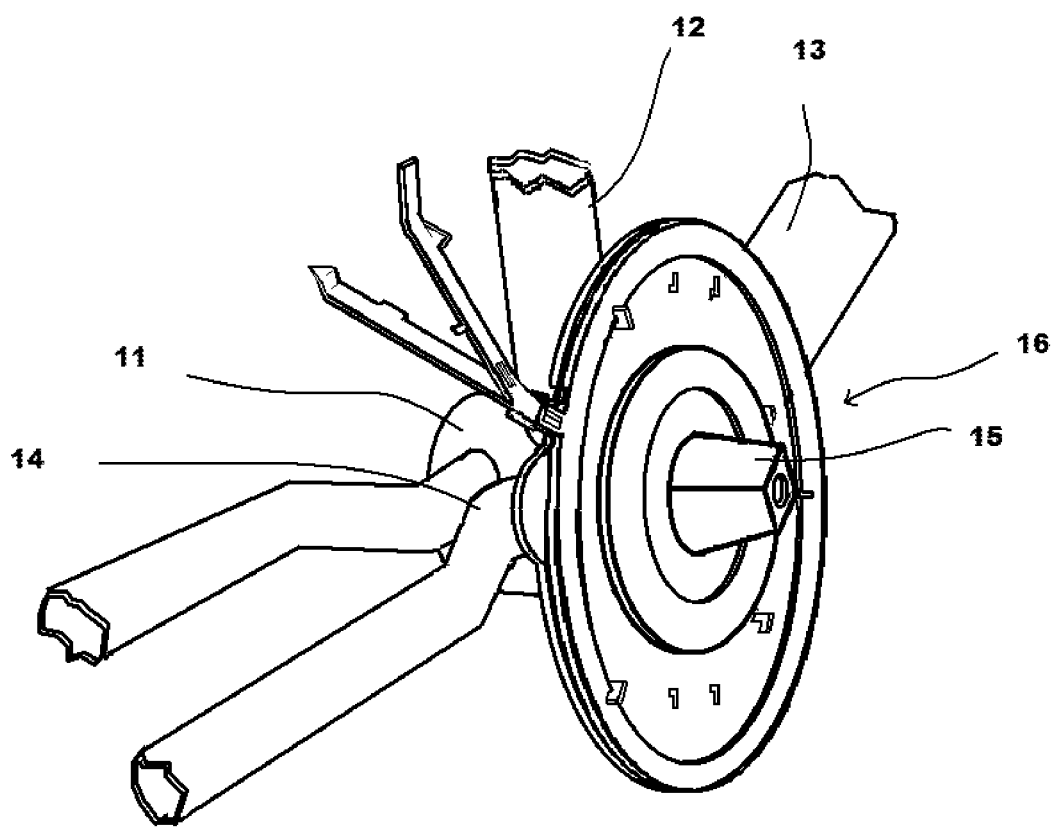
FIG. 1 is a perspective view of the proposed derailleur installed on the body of a square-taper cartridge bottom bracket within the bottom bracket shell of the bicycle frame.

With reference to the attached figures, FIG. 1 represents the position of the proposed derailleur on a typical bicycle frame and FIG. 2 is an exploded view of the same assembly. Typically modern bicycles have a bottom bracket 15 that screws into bottom bracket shell 11. The crankset 20 is further attached to the bottom bracket spindle. Most bicycles also have a down tube 13, a seat tube 12 and chain stays 14. Some bicycles, however, dispense with the seat tube as is the case with full suspension bicycles and that creates a problem for traditional front derailleurs, which are usually attached to the seat tube 12. In the proposed invention, the derailleur 16 is fastened by the bottom bracket 15 to the bottom bracket shell 11 rendering the seat tube 12 redundant for the purpose of support.

In FIG. 3 the proposed derailleur is shown in inboard perspective, where the base 31 and the actuator 32 are illustrated. FIG. 4 is an outboard i.e. towards the sprockets perspective view, showing the third component of the derailleur—the ring with the upshift and downshift arms.

Figure 5:
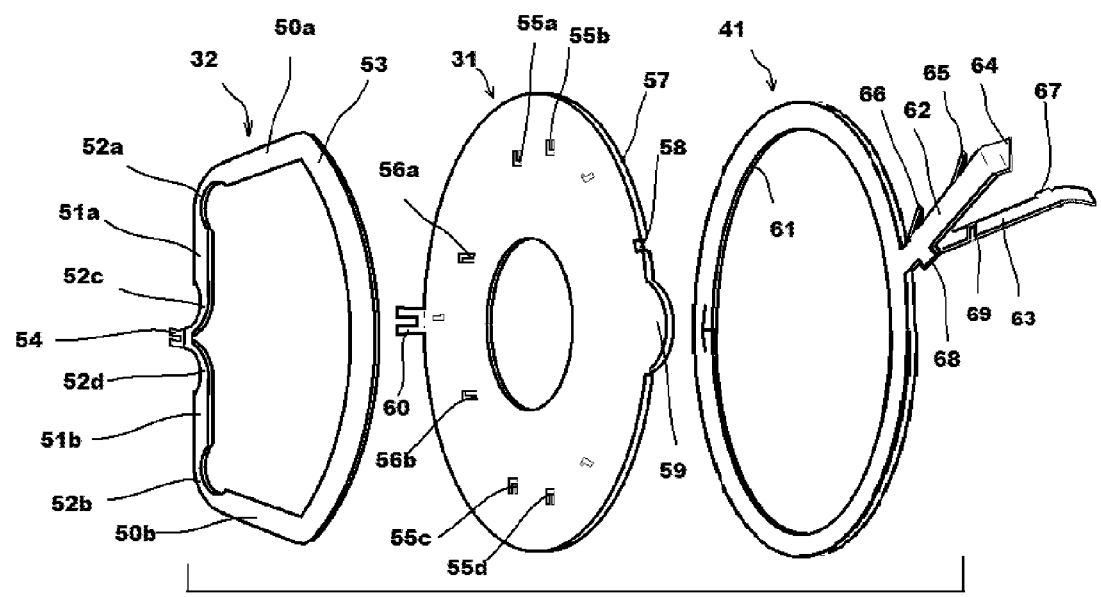
FIG. 5 is an exploded view of the proposed derailleur.

FIG. 5 is a detailed exploded view of the 3 components of the derailleur where: the base 31 on its inboard (towards the frame) face has the following elements: 55a,55b,55c and 55d are sliders for actuator 32 shoulders 50a and 50b. 56a and 56b are fulcrums to levers 51a and 51b. 60 is a stop gate for the housing of a Bowden cable (not shown). 58 is a recess for follower 66 when the ring 41 is in a stationary (stowed) position. 57 is the edge of the base 31 on which the follower 66 slides after being ejected by the cam 53 of the actuator 32 from the groove 58. The purpose of the bulge 59 is to deflect arms 62 and 63 in a flush position with the sprockets in order to prevent impinging on chain stay 14. Tooth 64 on upshift arm 62 engages the chain from the smallest sprocket and carries it to the medium sprocket. Likewise, tooth 64 on arm 62 engages the chain from the medium sprocket and carries it to the largest sprocket. Downshift arm 63 performs two functions:

entrains the whole ring assembly 41 with the sprockets by meshing tooth 67 with the teeth of the largest sprocket and lets the chain slide down from a larger to a smaller sprocket Stopper flange 69 provides a restraint for the chain to further slide down and off the smallest sprocket, should the operator initiate a downshift while the chain is riding on the smallest sprocket.

Figures 6, 7, 8:
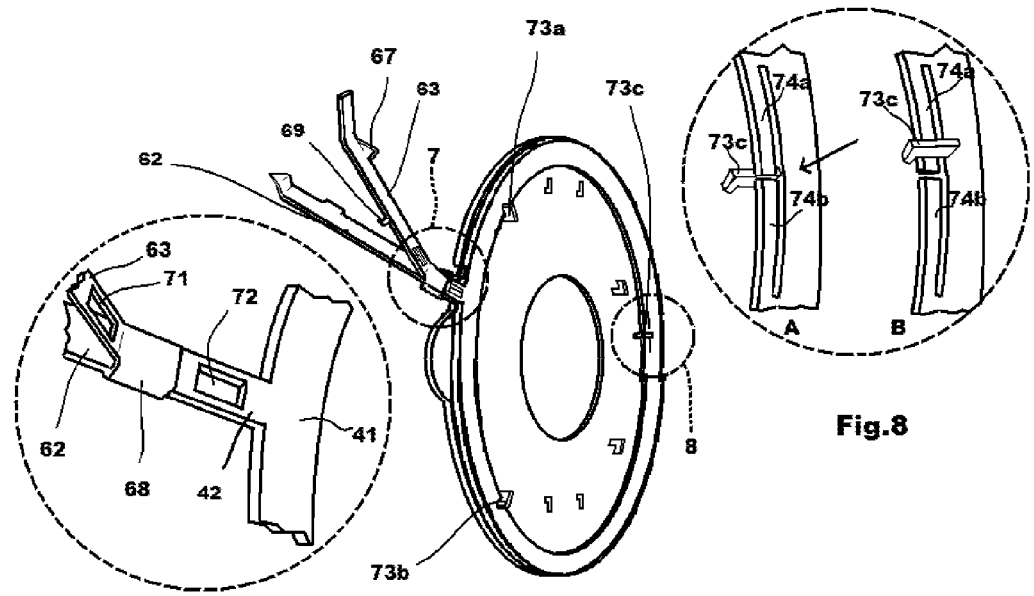
FIG. 6 is a inboard perspective view focusing on certain parts to be represented in enlarged views.
FIG. 7 is an enlarged view of the junction of the derailleur ring and the derailing arms.
FIG. 8 is an enlarged view of the ring lamellae with one of the ring races before and after mounting.

In this preferred embodiment, the whole ring with the arms assembly 62,63 is formed from a single cut or stamped flat form of spring steel material. After obtaining the flat form, downshift arm 63 is positioned under the upshift arm 62 by bending the connecting strip 68. Internal edge 61 of ring 41 allows rotation about races 73a,73b and 73c formed on the outboard face of the base 31 as seen in FIG. 6. FIG. 8 is an enlarged view of a portion of ring 41 where a cut forms 2 flexible lamellae 74a and 74b allowing the mounting of the ring 41 on races 73a,73b and 73c without implementation of fasteners or tools. FIG. 8A shows support 73c positioned under the lamellae 74a and 74b. FIG. 8B shows the support 73c after passing through the gap of the flexed lamellae 74a and 74b, restraining axial motion of ring 41.

Returning to FIG. 5, it should be noted that the actuator 32 in this embodiment of the invention is also formed from a single cut or stamped flat form of spring steel material and consequently is resiliently flexible.

To mount the actuator 32 on the slide guides 55a,55b,55c and 55d, shoulders 50a and 50b are pulled slightly apart, enough to pass over the restraining edges of the slide guides 55a,55b, 55c and 55d. This flexibility is allowed by cutouts 52a, 52b, 52c and 52d, which also act as articulated spring joints when levers 51a and 51b pivot upon fulcrums 56a and 56b.

Flange 60 is for connecting the actuator 32 to the control lever-shifter (not shown or claimed) on the handlebar by means of a Bowden cable (not shown).

FIG. 7 is at the heart of the invention. It is an enlarged view of the shank 42 connecting the ring 41 to the arms 62 and 63. To be noted here, are cutouts 71 and 72. They weaken the material, creating resilient, articulated joints. When the follower 66 in FIG. 5 is pushed by the cam 53, the joint formed by cutout 72 in FIG. 7 flexes first. When the downshift arm 63, better seen in FIG. 6, presses against the largest sprocket, the joint formed by cutout 71, as seen in FIG. 7, also flexes, allowing further travel of the upshift arm 62.

Figure 9:
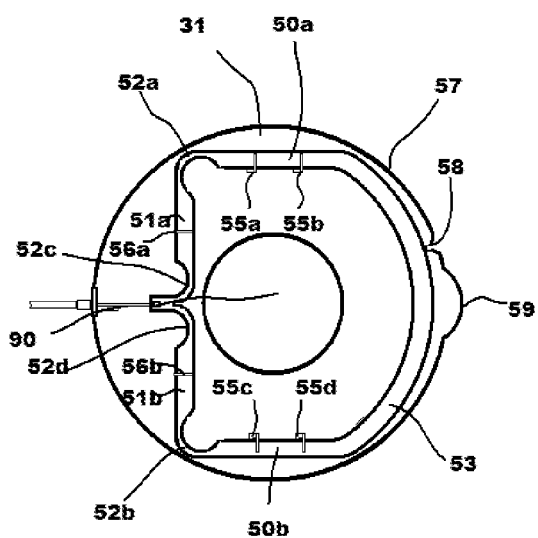
FIG. 9 is an outboard view of the derailleur base and the actuator in retracted position.
Figure 10:
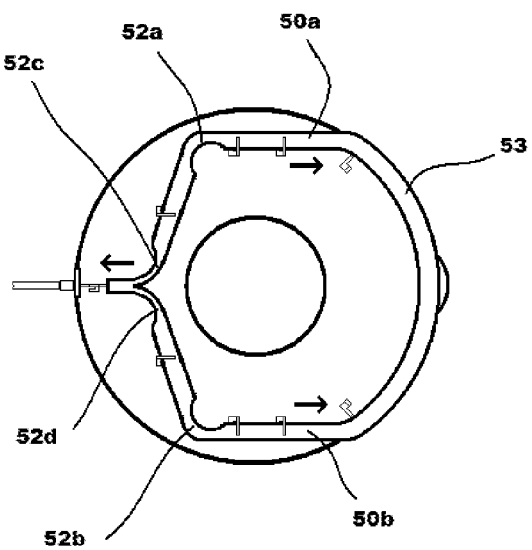
FIG. 10 is an outboard view of the derailleur base and the actuator in extended position.
Figure 11:
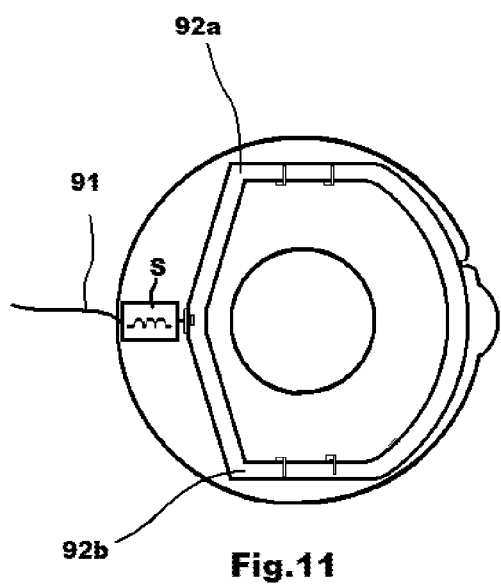
FIG. 11 is an outboard view of another preferred embodiment of the derailleur base and the actuator in retracted position.
Figure 12:
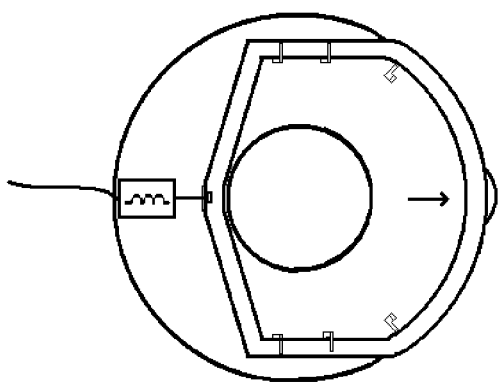
FIG. 12 is an outboard view of another preferred embodiment of the derailleur base and the actuator in extended position.

FIG. 9 and FIG. 10 depict the operation of the actuator. In FIG. 9 the actuator is in the inactive position, cam 53 is retracted and groove 58 is open. When the operator pulls the control lever (not shown) on the handlebar, the resulting tug of the Bowden cable 90 pulls the proximal ends of levers 51a and 51b causing by way of pivoting around fulcrums 56a and 56b an opposite direction movement of the distal ends. Shoulders 50a and 50b slide along slide guides 55a,55b,55c and 55d and extend cam FIG. 13 shows an inboard view of the derailleur in its inactive (stowed) position with the sprockets 130 and the chain 131 in the background. FIG. 14 is an enlarged view of the follower 66 recessed in the groove 58 and the cam 53 in retracted position.

FIG. 15 is an inboard view of the derailleur upon activation with the sprockets 130 and chain 131 in the background. At the pull of the lever by the operator, the actuator slides, extending the cam 53. As better seen in FIG. 16, the cam 53 ejects the follower 66 from the groove. The follower 66 imparts a tilt of both arms 62 and 63, until arm 63 comes to rest against the largest sprocket 130 and tooth 67, as seen in FIG. 17 and meshes with the sprocket teeth. The meshed tooth 67 entrains the whole ring assembly to rotate with the sprockets.

Figures 18, 19:
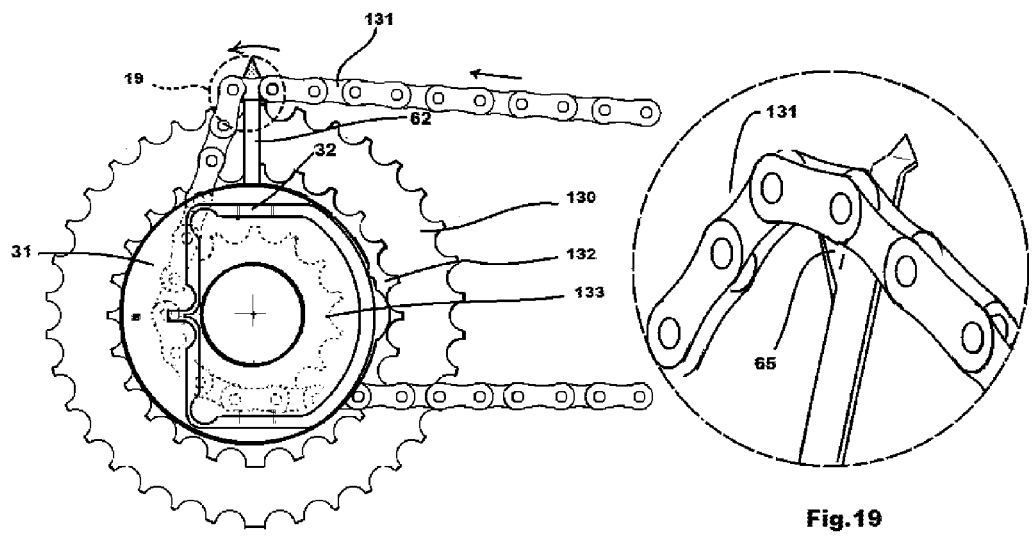
FIG. 18 is an outboard view of the derailleur upshifting from the smallest sprocket to the medium one.
FIG. 19 is an enlarged view of the chain lifted by the lower tooth of the upshifting arm.

If the operator keeps the lever depressed, the extended cam, by way of the follower, positions arm 62 under the chain 131 as seen in FIG. 18, where the chain 131 is riding on the smallest sprocket 133. In this position of the arm 62, the lower tooth 65 is positioned directly under the chain 131 and upon further rotation engages and lifts the chain 131 as seen in FIG. 19. The downward pressure of the chain 131 forces the upshift arm 62 to pivot and lean against the downshift arm, moving the chain in the plane of medium sprocket 132.

Figures 20, 21:
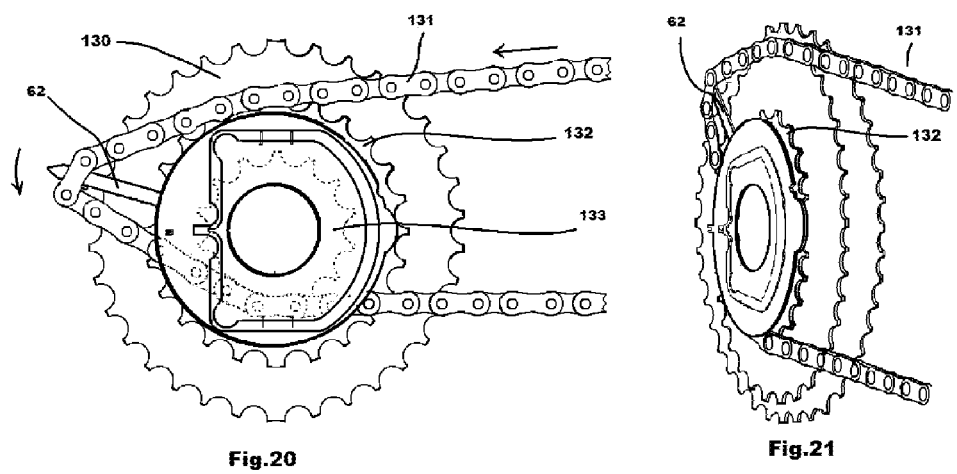
FIG. 20 is an outboard view of the derailleur with the chain transitioning from the smallest sprocket to the medium sprocket through the agency of the upshinfting arm.
FIG. 21 is a perspective view of the same process.

FIG. 20 shows the arms/chain/sprockets assembly about ⅓ of full rotation. the front stretch of the chain 131 is still on the smallest sprocket 133, while the stretch behind the upshift arm 62 has landed on the medium sprocket 132. FIG. 21 gives a perspective view for better visualization of the process. Not shown remains the complete travel of the ring after being released by the chain. The upshift arm continues to entrain the ring assembly with the rotating sprockets as long as the follower slides along the edge of the base. Only when the follower reaches the groove the resiliency of the bent shank nudges it inside. Tension of both arms is relieved and they assume their original position. This disengages the entraining tooth of the downshifting arm from the largest sprocket and the ring is locked in its inactive (stowed) position.

Figure 22:
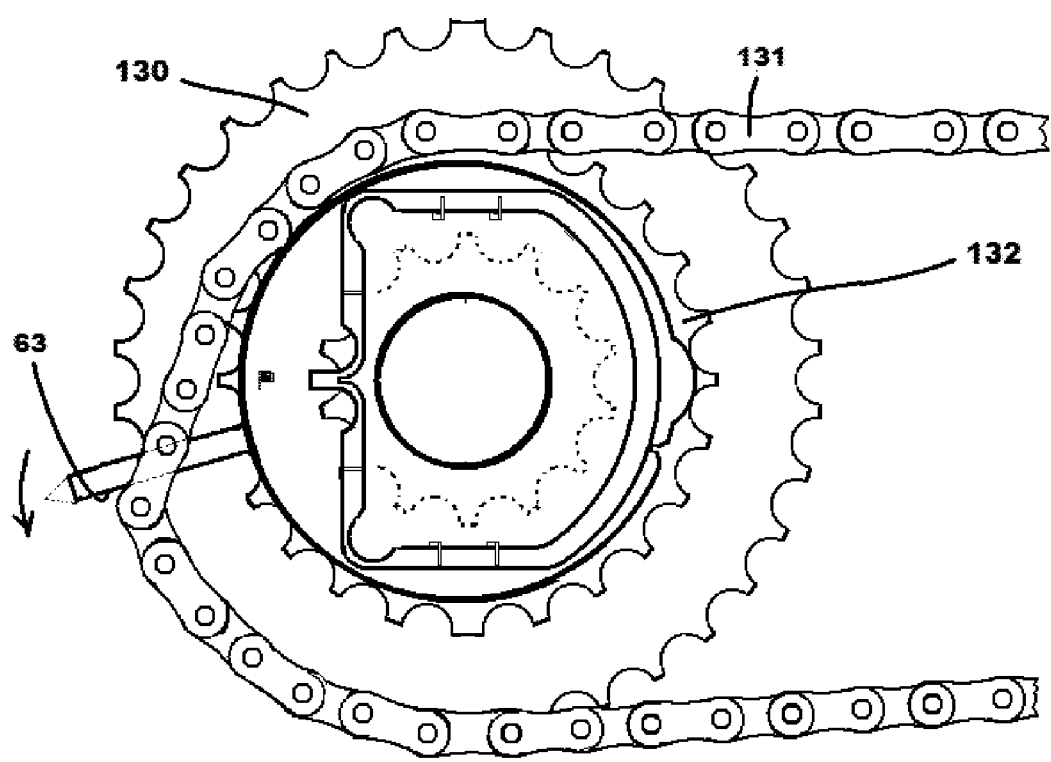
FIG. 22 is an outboard view of the derailleur with the chain transitioning from the largest sprocket to the medium sprocket through the agency of the downshifting arm.
Figure 23:
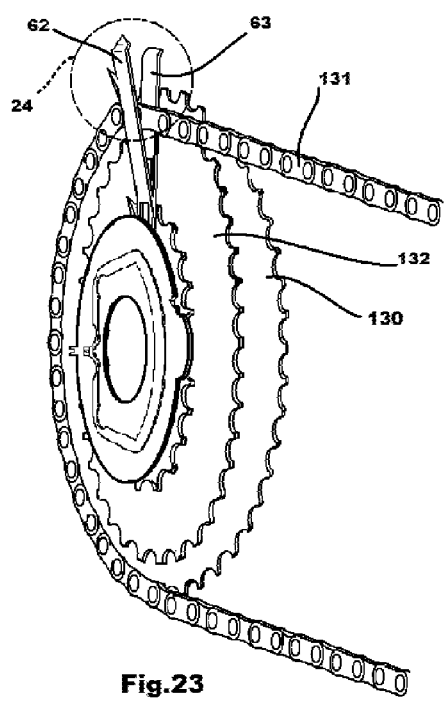
FIG. 23 is a perspective view of the derailleur with the chain transitioning from the largest sprocket to the medium sprocket through the agency of the downshifting arm.
Figure 24:
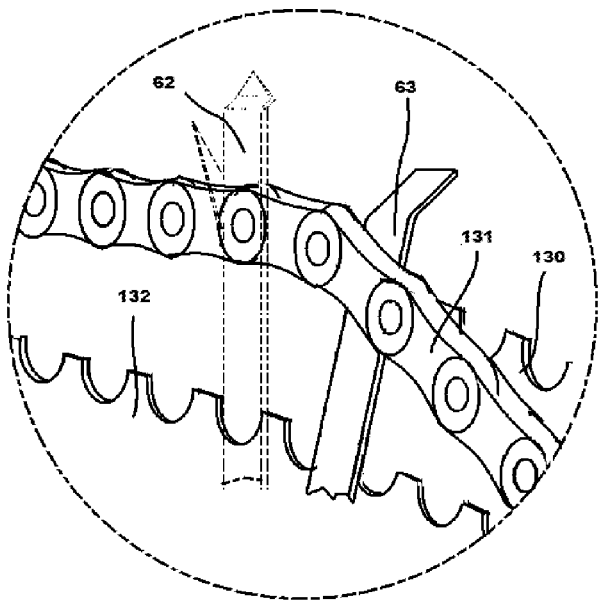
FIG. 24 is an enlarged view of the chain sliding down the downshifting arm during the process of downshifting.

FIG. 22 shows in an inboard view of the derailleur, sprockets and chain in an advanced stage of downshifting. The selection of a downshifting sequence follows a short pull of the control lever—shifter by the operator. The entraining tooth of the downshift arm meshes with the largest sprocket and sets the ring in motion, but since the cam is retracted, the follower slides along the edge of the base keeping the upshifting arm out of the planes of the sprockets. This is better seen in FIG. 23 and FIG. 24. The chain 131 slides down the smooth surface of the downshift arm 63 one sprocket at a time, since the lateral rigidity of the chain and the short stretch involved limit the chain side travel to one sprocket width.

Figure 25:
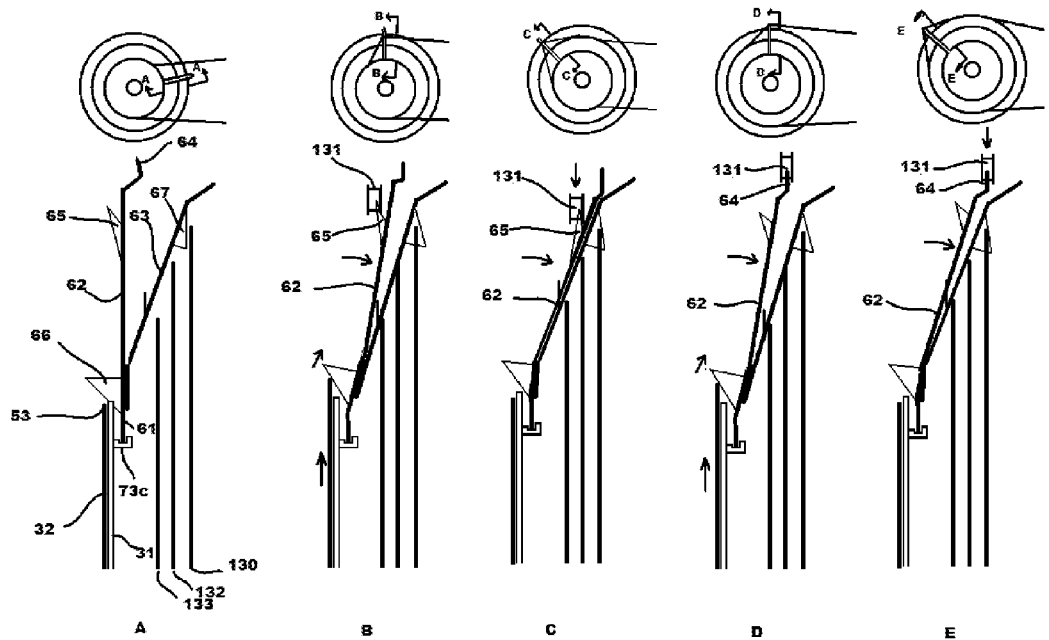
FIG. 25 is a schematic diagram of the process of upshinfting from the smallest to the medium sprocket and from the medium to the largest sprocket.

FIG. 25 is a sectional schematic diagram showing all the phases of upshifting beginning from stowed position. FIG. 25A is of the ring in stowed position and the chain 131 rotates with sprocket 133. Cam 53 is retracted, follower 66 is recessed in the groove of the base 31, shank 61 is relaxed, arm 62 is upright and entraining tooth 67 is free.

FIG. 25B shows the initiation of an upshift. The actuator 32 slides upwards and extracts the cam 53, which in turn ejects the follower 66 from the groove, bending the shank 61. Arms 62 and 63 tilt towards the sprockets 130,132 and 133, arm 63 coming to a stop against sprocket 130 and entraining tooth meshing with the sprocket's teeth. Because the cam 53 remains extracted, arm 62 remains tilted and toot 63 is in the plane of sprocket 133 subsequently engaging and lifting the chain.

FIG. 25C shows the side movement of the chain and its deposition on sprocket 132. Under the downward pressure of the chain 131 on tooth 65, the arm 62 pivots and rests on arm 63 bringing the chain in the plane of sprocket 132. Upon further rotation, the chain lands on the teeth of sprocket 132. Upon completing the cycle, the ring is brought back into the stowed position of FIG. 25A with the follower sinking into the groove and locking the ring in stationary position.

FIGS. 25D and 25E show the same process of upshifting from sprocket 132 to sprocket 130. It involves the upper tooth 64 of arm 62 which is positioned in the plane of socket 132 by the cam and follower.

Figure 26:
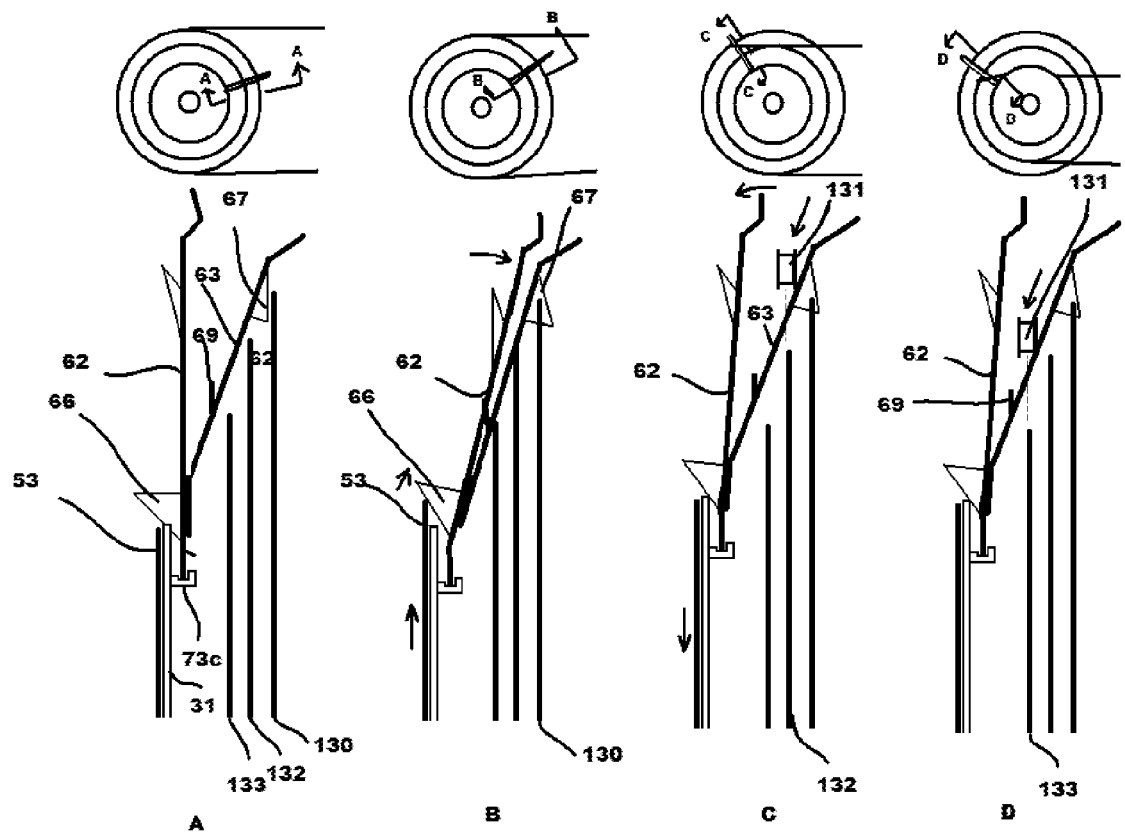
FIG. 26 is a schematic diagram of the process of downshifting from the largest to the medium sprocket and from the medium to the smallest sprocket.

FIG. 26 is another sectional schematic diagram showing all the phases of downshifting.

FIG. 26A shows the ring in stowed position and the chain positioned on sprocket 130.

FIG. 26B shows the initiation of a downshift. The operator pulls the control lever-shifter shortly and ejects follower 66. The arms tilt and entraining tooth 67 meshes with the teeth of sprocket 130 causing the ring to rotate with the sprockets. The cam 53 retracts.

As seen in FIG. 26C, the ejected follower 66 slides along the edge of the base 31 preventing tooth 67 to disengage from the sprocket, at the same time since the cam 53 is retracted, arm 62 returns in a substantially upright position, away from the plane of the sprockets. This exposes the downshift arm 62 to the chain 131, which lands on its smooth surface and starts sliding down under its downward pressure. Since the chain has a limited side flexibility and the stretch involved is short, it travels only one sprocket width, landing on the teeth of sprocket 132. Upon completion of the cycle, the ring is brought back into the stowed position of FIG. 26A with the follower sinking into the groove and locking the ring in stationary position.

FIG. 26D is the repetition of the same process from sprocket 132 to sprocket 133.

Although the foregoing embodiment has been described in great detail of construction and material, variations and modifications in the spirit of the invention are possible. Accordingly, the disclosure, description and figures are for illustrative purposes only and do not in any way limit the invention, which is defined only by the claims.

I claim:

1. A front derailleur for a chain driven bicycle transmission with multiple sprockets comprising
    a rotatable ring having at least one chain engaging arm;
    an actuator having an extractable cam surface;
    a base mountable on the bicycle frame having races for mounting said rotatable ring and slide guides for mounting said actuator.

2. A derailleur as in claim 1, wherein said rotatable ring has a substantially flat surface and has a first chain engaging arm substantially superposed over a second chain engaging arm.

3. A derailleur as in claim 2, wherein said rotatable ring has two resilient lamellae formed in the inner circumference of the ring opposite to said chain engaging arms allowing tool-free mounting of the ring on the race.

4. A derailleur as in claim 3, wherein said first chain engaging arm has at least one chain engaging means distal to said first resilient member and a cam follower proximal to said first resilient member.

5. A derailleur as in claim 3, wherein said second chain engaging arm has a sprocket engaging means formed distally to said second resilient member and a chain restraining flange formed proximally to said second resilient member.

6. A derailleur as in claim 5, wherein said first resilient member and said second resilient member are rendered substantially flexible by means of cutouts in said resilient sheet metal.

7. A derailleur as in claim 5, wherein said rotatable ring, said first chain engaging arm and said second chain engaging arm are rendered substantially rigid by forming flanges along the edges of said elements.

8. A derailleur as in claim 7, wherein said linkage means consist of two pivoted levers converting the pull of the cable to push on said shoulders.

9. A derailleur as in claim 7, wherein said actuator is made as a unitary flat form of resilient sheet metal and said hinges are formed by cutouts at the corners.

10. A derailleur as in claim 7, wherein said actuator is made as a unitary flat form of resilient sheet metal and said hinges are formed by connecting flanges at the corners.

11. A derailleur as in claim 7, wherein said shoulders are rigidly connected by a bar connected to a solenoid push piston, electronically activated by a controller on the bicycle handlebar.

12. A derailleur as in claim 3, wherein said rotatable ring, said first chain engaging arm, said second chain engaging arm, said first resilient member and said second resilient member are made as a unitary flat form of resilient sheet metal, further shaped by means of bending.

13. A derailleur as in claim 2, wherein said first chain engaging arm is substantially elongated, rigid, flat and coplanar to said rotatable ring and is cantilevered by a first resilient member substantially flat and coplanar to said rotatable ring and said second chain engaging arm is substantially elongated, rigid, flat and is cantilevered at a substantial angle to said first chain engaging arm by a second resilient member.

14. A derailleur as in claim 1, wherein said actuator includes a flat arch forming two perpendicular straight shoulders from the concave side of the arch, the convex edge of the arch forming a cam and said shoulders being resiliently hinged to linkage means connecting one end of a cable to an operator controlled lever.

15. A derailleur as in claim 1, wherein said base is a flat disc and includes
    a central, circular orifice in the base for mounting the derailleur on the bicycle frame;
    a substantially circular edge forming a stationary cam surface;
    a recess in the edge accepting a cam follower;
    on the sprocket side of the base—at least three races with ring retaining ridges;
    on the bicycle frame side of the base—at least two collinear slide guides with shoulder retaining ridges on each side of the circular orifice;
    two collinear fulcrums, orthogonal to the slide guides, pivotal to the levers;
    an attachment point for the housing of the control cable.

16. A derailleur as in claim 1, wherein said base is a unitary flat form shaped from sheet metal.

17. A derailleur as in claim 1, wherein said base is a unitary plastic molding.

* * * * *